July 18, 1950  T. PATRIGNANI  2,515,795
DEVICE FOR CONVERTING A ROTARY MOTION INTO
A RECIPROCATORY MOTION OR VICE VERSA
Filed Nov. 15, 1946

Inventor
Theo Patrignani
by Sommers & Young
Attorneys

Patented July 18, 1950

2,515,795

UNITED STATES PATENT OFFICE 2,515,795

DEVICE FOR CONVERTING A ROTARY MOTION INTO A RECIPROCATORY MOTION OR VICE VERSA

Theo Patrignani, Lecco, Italy

Application November 15, 1946, Serial No. 710,080
In Italy November 16, 1945

6 Claims. (Cl. 74—50)

This invention relates to a device for converting rotary motion into reciprocating motion and vice versa and is adapted to supersede the well-known crank and connecting rod system.

Constructions of this type are known, in which the rotating shaft carries an eccentric, having mounted thereon, with the interposition of anti-friction members, an annulus cooperating with a crosshead or other connector, having connected thereto members which, on rotation of the eccentric, are imparted a rectilinear reciprocating motion in a direction perpendicular to the shaft axis.

In the known constructions the connection between the crosshead or connector and the members performing a reciprocating motion does not admit of any elastic yielding in the direction of the reciprocating motion, which results in a rigid transmission and easily leads to wear of the connecting members and ensuing clearances which are the cause of rough shocks on the passage over dead centers and of rapid wear of the transmission.

The object of this invention is to provide a device of the above mentioned character which avoids the drawbacks referred to.

A further object of this invention is to provide a transmission device of the character mentioned above, in which a resilient member is interposed between the members performing the reciprocating motion and crosshead or connector, takes up any wear and makes the passage of the transmission elements over dead centers smoother, thereby avoiding shocks and consequent wear of said elements.

A further object of this invention is to provide a transmission device of the above mentioned type, in which one eccentric keyed on the rotating shaft has cooperating therewith a plurality of annuli, one of which directly acts on one of the members performing a reciprocating motion and the other annulus or annuli directly act on the other member performing a reciprocating motion. This results in a simpler construction of reduced weight.

A further object of this invention is to provide a transmission device of the above mentioned type, in which the connecting member consists of a cage secured to one of the members performing a reciprocating motion and connected to the other reciprocating member through the interposition of the resilient member.

In the accompanying diagrammatic drawing is illustrated by way of example a constructional embodiment of the device according to the invention assuming the same to be used for actuating a piston such as a compressor piston.

Figure 1:
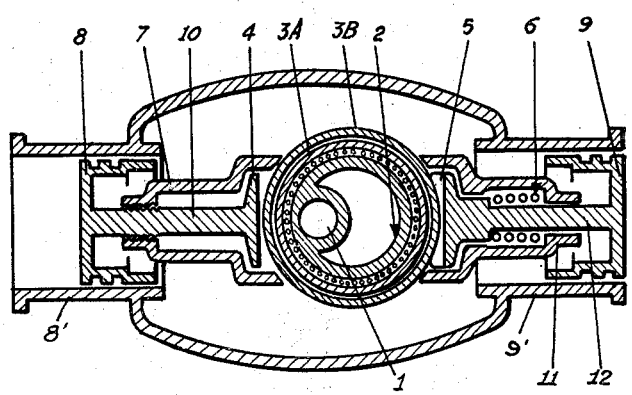
Fig. 1 is a sectional view at right angles to the shaft.
Figure 2:
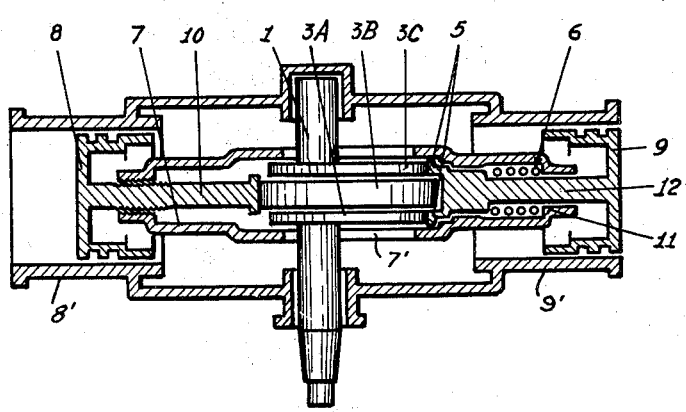
Fig. 2 is a sectional view along the shaft axis.

I designates the shaft to which is keyed an eccentric 2. Three annuli are mounted about the eccentric 2 with the interposition of bearing members such as balls, rollers or needles, the said annuli comprising a central annulus 3B and a pair of lateral annuli 3A and 3C. If required, the eccentric may have wedged thereto roller bearings or ball bearing races instead of forming on the periphery of the eccentric three grooves for the three rows of bearing members of the annuli, as shown in the drawing. In bearing relation with the central annulus 3B is a plate 4 carried by the rod 10 of the piston 8 reciprocating in a cylinder 8'. In similar bearing relation with the annuli 3B and 3C are a pair of plates 5 carried by a yoke member integral with the rod 12 of the piston 9 reciprocating in a cylinder 9' coaxial and opposite to the cylinder 8'. The yoke member for the plates 5 carried by the rod 12 of the piston 9 is so provided as to reserve a certain amount of clearance with respect to the central annulus 3B. Secured to the rod of one of the pair of pistons (to the rod 10 of the piston 8 in the illustrated drawing) in adjustable way, for example by being screwed to it, is a cage member 7 having middle apertures 7' for the shaft 1. This cage member 7 extends to the rod 12 of the piston 9 and surrounds said rod by its end sleeve 11. A helical spring 6 is inserted between the sleeve 11 and a suitable projection on the rod 12 of the piston 9. This shoulder is adjacent to the yoke member carrying the plates 5. The spring 6 provides a resilient connection between both pistons 8 and 9 while forcing the plates 4 and 5 into abutting relation with the corresponding annuli and while automatically taking up any wear.

The aforesaid device is assumed to be utilizable by way of example on a compressor but may be applied to any motion-transmitting mechanism, wherever it is necessary to convert a rotary motion into a reciprocatory rectilinear motion or vice versa, quite apart from its application to pistons or like members. Furthermore, the possibility is afforded according to the invention, in some cases and without sacrificing the advantages and principle herein disclosed, of providing the annulus and corresponding plate respectively with a toothed sector and an intermeshing rack, whereby the rolling motion should be ensured without any possibility of slip or creepage from any of the contacting and interengaging members to the other.

I wish it to be understood that I do not desire to be limited to the exact details of construction as described, for obvious modifications will occur to a person skilled in the art.

What I claim is:

1. In an apparatus for converting a rotary motion into a reciprocatory rectilinear motion or vice versa the combination of a metallic casing, a driving shaft on bearings in said casing carrying an eccentric, a central ball bearing mounted on said eccentric, two lateral ball bearings symmetrically mounted on said eccentric, two rods capable of reciprocating in the said casing along one and the same straight line, means for maintaining said straight line constantly normal to the driving shaft, one of said rods having at one end a plate extending normal thereto and resting against the central ball bearing, said other rod ending in a yoke carrying at its ends two plates lying in the same plane and normal to the yoke carrying rod and resting on the two lateral ball bearings, means for bringing said plates at the ends of said rod and yoke, respectively, into contact with the central ball bearing and lateral ball bearings.

2. In an apparatus for converting a rotary motion into a reciprocatory rectilinear motion or vice versa the combination of a metallic casing, a driving shaft on bearings in said casing carrying an eccentric, a central ball bearing mounted on said eccentric, two lateral ball bearings symmetrically mounted on said eccentric, two rods capable of sliding with respect to said casing along one and the same straight line, means for maintaining said rods on said straight line constantly normal to the driving shaft, one of said rods having at one end a plate extending normal thereto and resting against the central ball bearing, said other rod ending in a yoke carrying at its ends two plates lying in the same plane and normal to the yoke carrying rod and resting on the two lateral ball bearings, a cage fixedly connected with one of said rods and slidable with respect to said other rod, maintaining the plates at the end of said rod and yoke in contact by means of a spring with said central ball bearing and lateral ball bearings, respectively.

3. In apparatus of the kind described, the combination with a metallic casing, a driving shaft on bearings in said casing carrying an eccentric, a central ball bearing and two lateral ball bearings symmetrically mounted on said eccentric, two coaxial cylinders integral with said metallic casing having their axis normal to the driving shaft, two pistons mounted in said cylinders, two rods fixed on said pistons ending by a plate normal to said rod and by a yoke respectively, said yoke carrying at its ends two plates lying in the same plane normal to the yoke carrying rod, the plate at the end of said rod resting on the central ball bearing and the plates at the yoke ends resting on the lateral ball bearings, means for bringing the plates at the end of the rod and yoke into contact with the central and lateral ball bearings, respectively.

4. In apparatus of the kind described, the combination with a metallic casing, a driving shaft on bearings in said casing carrying an eccentric, a central ball bearing and two lateral ball bearings symmetrically mounted on said eccentric, two coaxial cylinders integral with said metallic casing and having their axis normal to the driving shaft, two pistons mounted in said cylinders, two rods fixed on said pistons ending respectively with a plate extending normal to its rod and by a yoke, having at its ends two plates lying in the same plane and normal to said yoke carrying rod, the plates at the end of the rod and yoke resting on the central ball bearing and on the lateral ball bearings, respectively, a cage fixedly connected with one of said rods and capable of sliding with respect to the other which keeps the plates at the end of said rod and yoke, respectively, in contact by means of a spring with said central and lateral ball bearings.

5. In an apparatus for converting rotary motion into reciprocating rectilinear motion or vice versa the combination of a metallic casing, a driving shaft on bearings in said casing carrying an eccentric, a central ball bearing mounted on said eccentric, two lateral ball bearings symmetrically mounted on said eccentric, two rods capable of reciprocating in said casing along one and the same straight line, means for maintaining said straight line constantly normal to the driving shaft, one of said rods having at one end a plate extending normal thereto and resting against the central ball bearing, said other rod ending in a yoke carrying at its ends two plates lying in the same plane and normal to the yoke carrying rod and resting on the two lateral ball bearings, resilient means for bringing said plates at the ends of said rod and yoke, respectively, into contact with the central ball bearing and lateral ball bearings.

6. In apparatus of the kind described, the combination with a metallic casing, a driving shaft on bearings in said casing carrying an eccentric, a central ball bearing and two lateral ball bearings symmetrically mounted on said eccentric, two coaxial cylinders integral with said metallic casing having their axis normal to the driving shaft, two pistons mounted in said cylinders, two rods fixed on said pistons ending by a plate normal to said rod and by a yoke respectively, said yoke carrying at its ends two plates lying in the same plane normal to the yoke carrying rod, the plate at the end of said rod resting on the central ball bearing and the plates at the yoke ends resting on the lateral ball bearings, resilient means for bringing the plates at the end of the rod and yoke into contact with the central and lateral ball bearings, respectively.

THEO PATRIGNANI.

REFERENCES CITED

The following references are of record in the file of this patent:

UNITED STATES PATENTS

| Number | Name | Date |
| --- | --- | --- |
| 1,432,041 | Scott | Oct. 17, 1922 |
| 2,027,104 | Kahr et al. | Jan. 7, 1936 |
| 2,424,532 | Beard | July 22, 1947 |